US011339830B2

(12) United States Patent
Mack et al.

(10) Patent No.: US 11,339,830 B2
(45) Date of Patent: May 24, 2022

(54) BEARING HOUSING FILLER PLATE (71) Applicant: ITT MANUFACTURING ENTERPRISES LLC, Wilmington, DE (US)

(72) Inventors: Robby C. Mack, Canandaigua, NY (US); Susan E. Sullivan, Seneca Falls, NY (US)

(73) Assignee: ITT MANUFACTURING ENTERPRISES LLC, Wilmington, DE (US)

(*) Notice: Subject to any disclaimer, the term of this patent is extended or adjusted under 35 U.S.C. 154(b) by 56 days.

(21) Appl. No.: 15/847,035

(22) Filed: Dec. 19, 2017

(65) Prior Publication Data
US 2019/0186547 A1 Jun. 20, 2019

(51) Int. Cl.
*F16C 35/02* (2006.01)
*G01M 13/04* (2019.01)
(Continued)

(52) U.S. Cl.
CPC .......... *F16C 35/02* (2013.01); *F04D 15/0088* (2013.01); *F04D 29/0413* (2013.01); *F04D 29/406* (2013.01); *F04D 29/605* (2013.01); *F16C 17/06* (2013.01); *F16C 23/00* (2013.01); *F16C 35/00* (2013.01); *G01M 13/04* (2013.01);
(Continued)

(58) Field of Classification Search
CPC .......... F16C 35/02; F16C 23/00; F16C 35/00; F16C 17/06; F16C 17/08; F16C 2360/00; F16C 2233/00; F04D 15/0088; F04D 29/605; F04D 29/406; F04D 29/0413;
(Continued)

(56) References Cited

U.S. PATENT DOCUMENTS 2,921,298 A * 1/1960 Jackson ............... G01M 13/04
340/870.35
4,018,083 A * 4/1977 Hoffman .............. G01H 1/003
73/661
(Continued)

FOREIGN PATENT DOCUMENTS

| CN | 204479015 U | 7/2015 |
| CN | 205119175 U | 3/2016 |
| JP | 2016114085 A | 6/2016 |

OTHER PUBLICATIONS

Goulds Pumps, 3196 i-FRAME Jun. 2017 (24 pages).
(Continued)

*Primary Examiner* — Marrit Eyassu
(74) *Attorney, Agent, or Firm* — Carter, DeLuca & Farrell LLP; George Likourezos; Bret Shapiro (57) ABSTRACT

An apparatus is provided for providing access to one or more axial proximity probes for monitoring axial position of thrust collars of a pump shaft to enable improved adjustment of the axial proximity probes by the pump operator. The apparatus includes a plurality of side walls configured to surround one or more axial proximity probes configured to measure axial position of one or more thrust collars in a pump bearing housing, at least one access window formed through at least one side wall of the apparatus configured to provide access the one or more axial proximity probes and at least one removable access plate configured to cover the at least one access window.

18 Claims, 11 Drawing Sheets

(51) Int. Cl.
*F16C 17/06* (2006.01)
*F16N 13/00* (2006.01)
*F04D 29/041* (2006.01)
*F04D 15/00* (2006.01)
*F04D 29/60* (2006.01)
*F04D 29/40* (2006.01)
*F16C 35/00* (2006.01)
*F16C 23/00* (2006.01)
*F04B 51/00* (2006.01)
*F16C 17/08* (2006.01)

(52) U.S. Cl.
CPC .......... *F04B 51/00* (2013.01); *F05D 2260/80* (2013.01); *F16C 17/08* (2013.01); *F16C 2233/00* (2013.01); *F16C 2360/00* (2013.01); *F16N 13/00* (2013.01)

(58) Field of Classification Search
CPC .... G01M 13/04; F05D 2260/80; F16N 13/00; F04B 51/00
USPC ........................................................ 73/866.5
See application file for complete search history.

(56) References Cited

U.S. PATENT DOCUMENTS

| | | | | |
|---|---|---|---|---|
| 4,164,864 A | * | 8/1979 | Feller | G01B 7/14 |
| | | | | 324/207.11 |
| 4,367,652 A | * | 1/1983 | Venuso | G01F 15/18 |
| | | | | 73/201 |
| 4,495,810 A | * | 1/1985 | Tessarzik | G01D 11/30 |
| | | | | 324/207.24 |
| 4,628,732 A | * | 12/1986 | Makinen | G12B 9/00 |
| | | | | 73/866.5 |
| 4,877,381 A | | 10/1989 | Johnson et al. | |
| 6,227,061 B1 | | 5/2001 | Thermos | |
| 6,309,174 B1 | * | 10/2001 | Oklejas, Jr. | F04D 1/06 |
| | | | | 415/104 |
| 6,408,705 B1 | | 6/2002 | Thermos | |
| 8,943,912 B1 | | 2/2015 | Singleton et al. | |
| 2003/0198128 A1 | | 10/2003 | Carlson | |
| 2007/0003406 A1 | * | 1/2007 | Racer | F04D 9/007 |
| | | | | 415/111 |
| 2010/0150764 A1 | | 6/2010 | Simonelli et al. | |
| 2016/0084736 A1 | | 3/2016 | Schleif et al. | |
| 2017/0074693 A1 | | 3/2017 | Wolfe | |
| 2017/0234672 A1 | | 8/2017 | Campbell et al. | |
| 2017/0294296 A1 | | 10/2017 | Trivett et al. | |

OTHER PUBLICATIONS

European Examination Report dated Jul. 12, 2021 for corresponding European Patent Application No. 18 830 694.8, 6 pages.
Chinese Office action with translation dated Jul. 28, 2021, for corresponding Chinese Patent Application No. 201880087053.8 (21 pages).
Kang Shibin et al. "Research on Design of Distributed Intelligence Monitoring System for Magnetic Drive Pumps" China Rural Water and Hydropower No. 4, Apr. 15, 2009, 1 page (Abstract only).

* cited by examiner

BEARING HOUSING FILLER PLATE

BACKGROUND OF THE INVENTION

1. Field of the Invention

The present invention relates to an adapter for use in connection with a bearing housing having axial proximity probes to measure axial position of the thrust collar with respect to the thrust bearing.

2. Brief Description of Related Art

In current pump health monitoring systems, axial proximity probes are provided in connection with bearing housings to monitor axial position of the thrust collar with respect to the thrust bearing inside the bearing housing. The thrust collar may be a rotating shaft thrust collar and the thrust bearing may be a double acting tilt pad thrust bearing. During normal operation, the pump produces axial thrust load. This thrust load changes the position of the thrust collar towards one side of the thrust bearing. This position is measured and trended by the health monitoring system. As the thrust bearing wears, the axial position changes. The pump manufacturer provides the end user with preset axial position limits for Alarm and Shutdown alarms. The pump operator monitors the axial position and will take action if either Alarm or Shutdown occurs.

The axial proximity probes typically include a locking collar, such as a standard nut shown in the art, which can be used to set and adjust the axial proximity probe to the appropriate position using a wrench or other appropriate tool. API 670 refers to this locking collar as a "Jam Nut". For optimal operation of the axial proximity probes, it is preferable that the probes are set to the appropriate position after the pump has warmed up rather than when the pump and bearing housing are cold. However, in the prior art designs, setting the axial proximity probes in the field is a very time consuming and cumbersome task. An exemplary design according to the prior art is shown in FIGS. 1A-1D.

The prior art design includes a filler plate 12 arranged on one end of a bearing housing 10, with axial proximity probes 11, and an oil pump adapter 13. The filler plate 12 fills the void between the thrust bearing (not shown) and the oil pump adapter 13, and provides a structure to which the axial proximity probes 11 can be attached. Tilting pad thrust bearings require a well-controlled installation cavity depth from a tolerance standpoint. Unfortunately, the manufacturing tolerances of all of the tilting pad bearing components are not held very close, so the overall length of the tilting pad bearing assembly can vary quite a bit. As a result, the bearing cavity 10b can be made extra deep, and a filler plate 12 is added to take up most of the extra space. Thin shims can be added between the filler plate 12 and the oil pump adapter 13 to control the bearing cavity 10b depth dimension adequately.

The oil pump adapter 13 is secured to an auxiliary oil pump 20, which is configured to pump lubricating oil into the bearing housing 10 through piping 21. The shaft 10a and the axial proximity probes 11 are arranged through the filler plate 12, and the axial proximity probes 11 include locking collars 11a, such as hexagonal nuts, that are used to set the axial proximity probes 11 and lock them in place relative to the thrust collar (not shown) inside the bearing housing 10. Wring (not shown) is attached to the axial proximity probes 11 outside the bearing housing 10, so that the axial proximity probes 11 can be connected to a monitoring system which can be configured to display information regarding the axial position of the thrust collar or provide an alert if an excessive axial position change has occurred in the bearing housing 10. An opening 14 is provided in the oil pump adapter 13 that is configured to receive an end of a probe wiring housing 15. The probe wiring can be passed through the opening 14 and through the probe wiring housing 15, and exit through an opening (not shown) at the opposite end of the probe wiring housing 15.

Figure 1A:
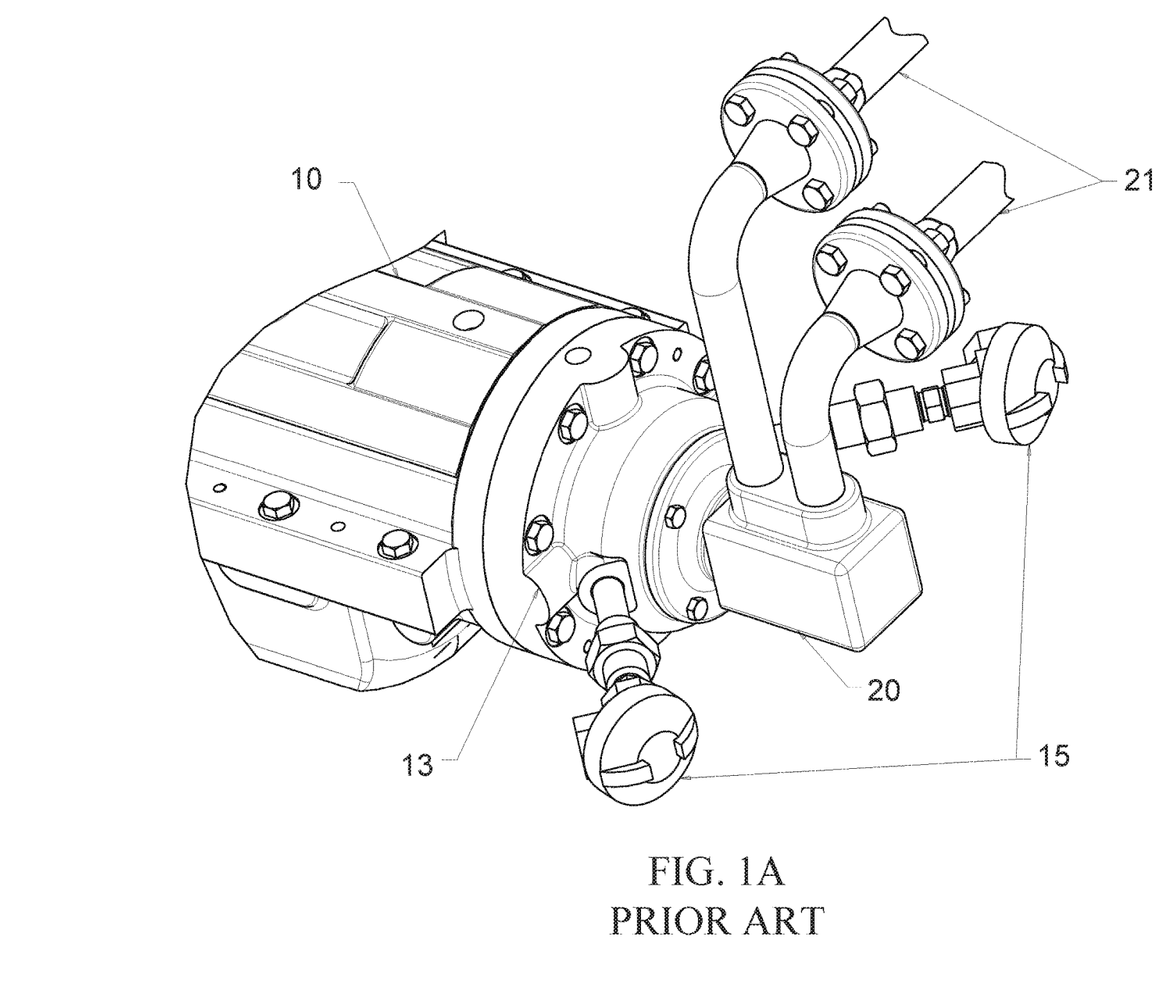
FIG. 1A shows a pump bearing housing comprising axial proximity probes and an auxiliary oil pump, according to the prior art.
Figure 1B:
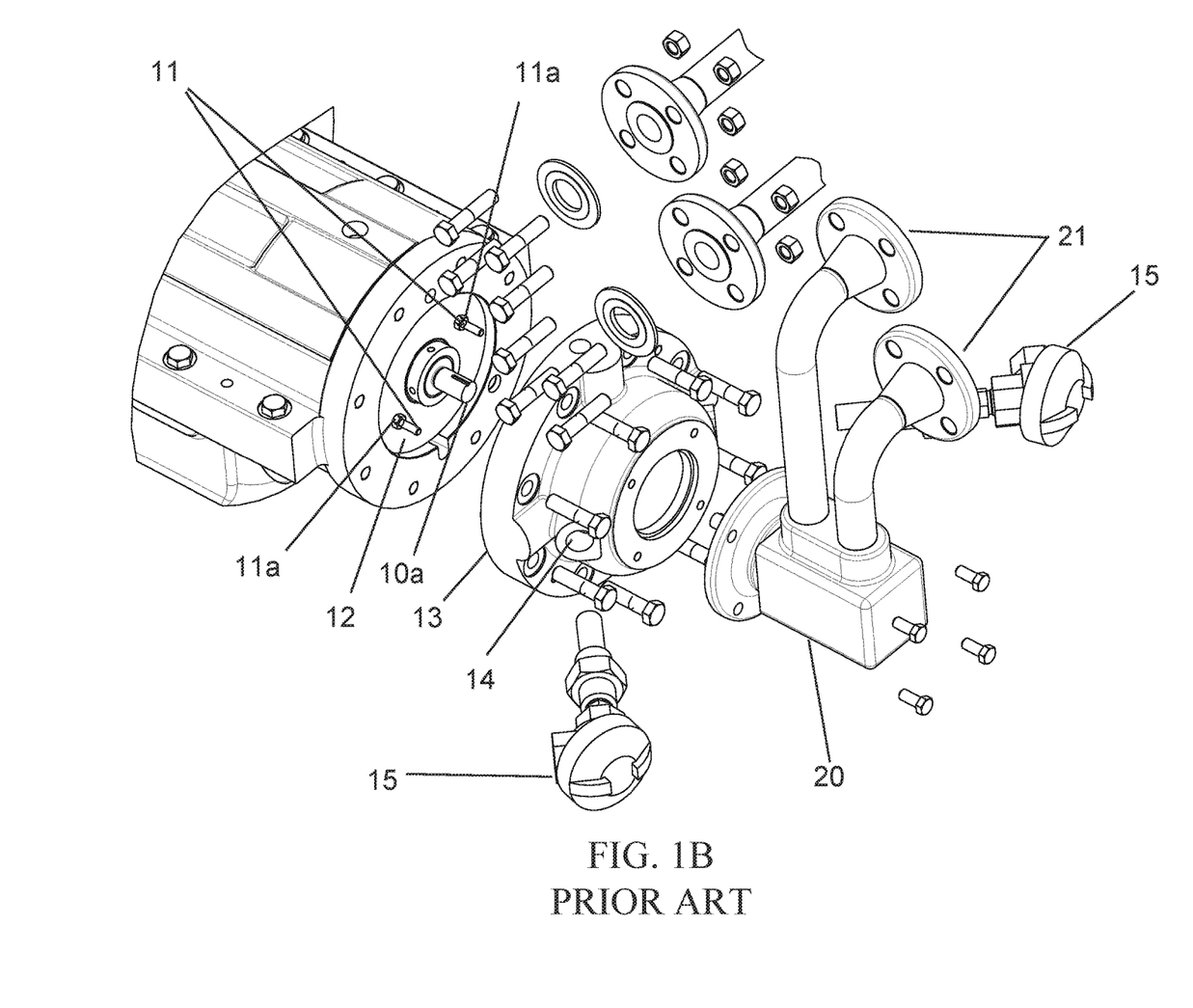
FIG. 1B shows a disassembled pump bearing housing comprising axial proximity probes and an auxiliary oil pump, according to the prior art.
Figure 1C:
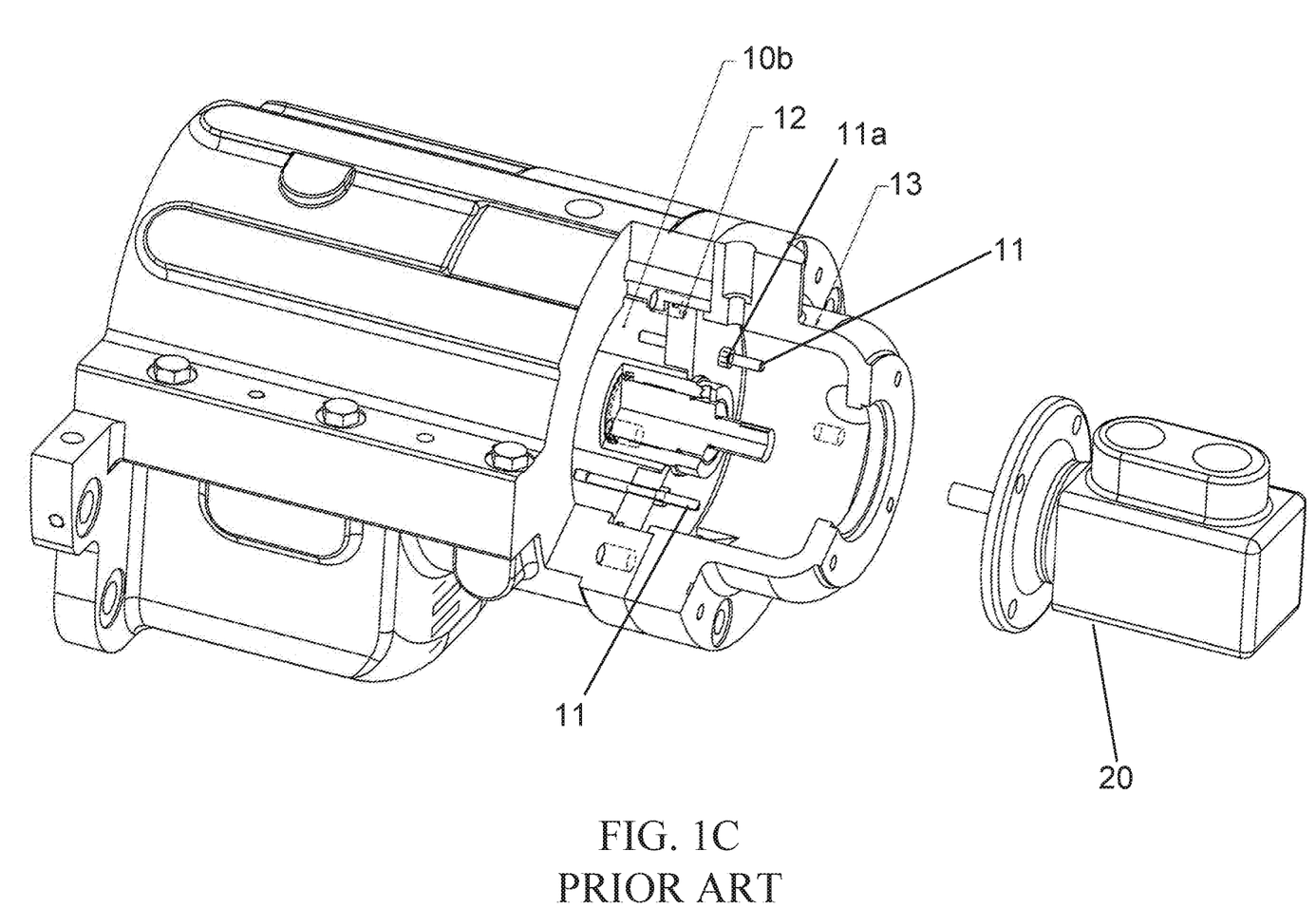
FIG. 1C shows a cross-sectional view of a pump bearing housing comprising axial proximity probes and an auxiliary oil pump, according to the prior art.
Figure 1D:
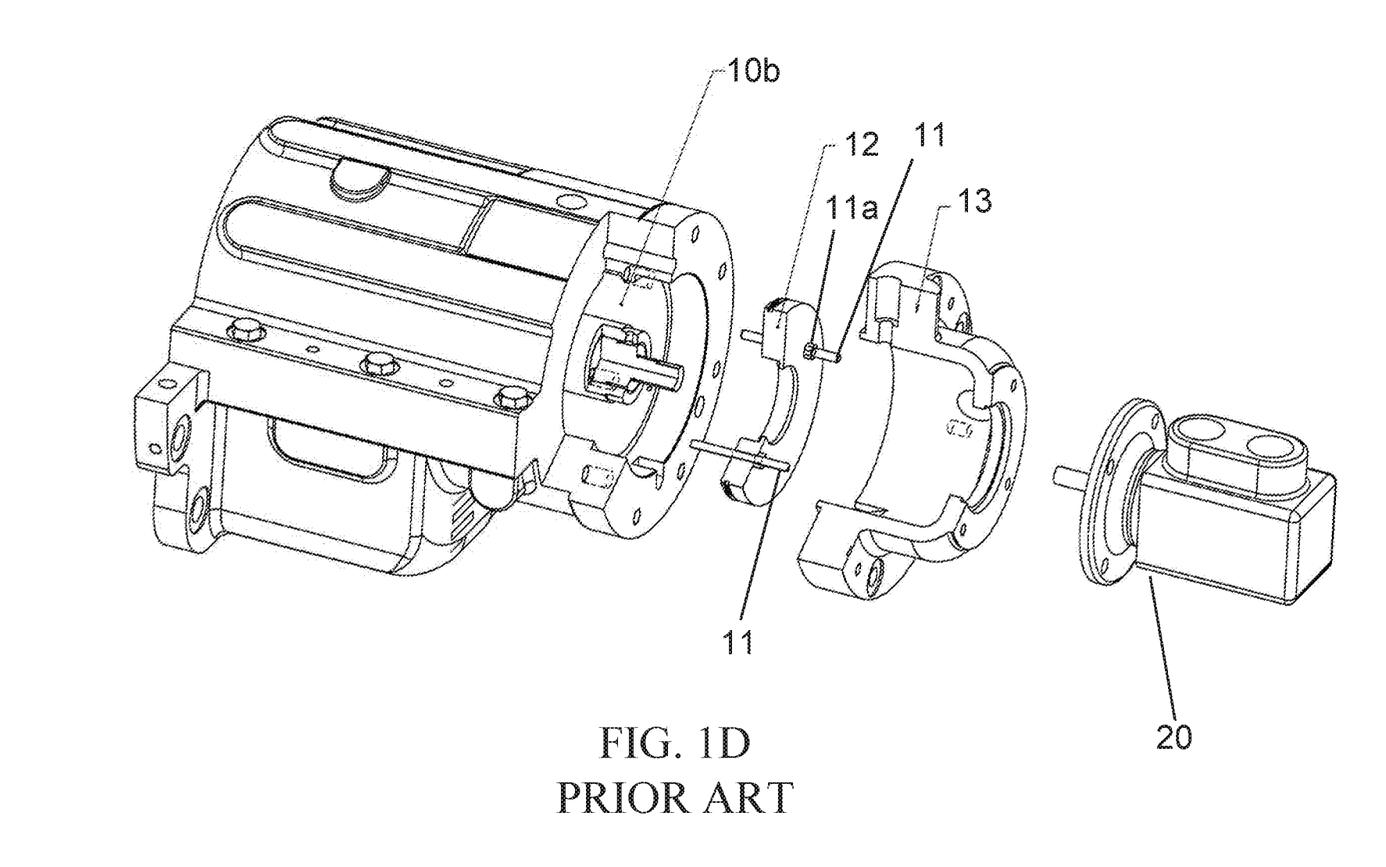
FIG. 1D shows a cross-sectional, exploded view of a pump bearing housing comprising axial proximity probes and an auxiliary oil pump, according to the prior art.

During field operation, the pump is warmed up with the bearing housing 10, oil pump adapter 13, probe wiring housings 15, auxiliary oil pump 20 and oil piping 21 fully assembled, as shown for example in FIG. 1A. However, once the pump is assembled, the axial proximity probes 11 cannot be accessed by a pump operator. In order to field set the axial proximity probes 11 after the machine is warmed up, the lube oil piping 21, the auxiliary oil pump 20, the proximity probe wiring connection housings 15 and the oil pump adapter 13 must be removed from the machine, as shown for example in FIG. 1B. With this design disassembled, the filler plate 12 is loose allowing for the final set point of the axial proximity probes 11 to be inaccurate. This procedure of disassembling and reassembling the pump in order to set the axial proximity probes 11 is also time consuming. It is an object of the present invention to address these shortcomings in the art.

SUMMARY OF THE INVENTION

The present invention addresses these shortcomings of the art by providing a design that integrates the filler plate and a portion of the oil pump adapter into one piece. This new design has openings on each side that allow for access to the axial proximity probes by removing only the proximity probe connection housings and the proximity probe access plates. This design approach makes field setting axial proximity probes safer, faster, and more accurate than the previous design. Safety is improved by eliminating spilled oil encountered when disconnecting the piping. This design also allows for faster field setting because fewer components have to be disassembled from the machine to obtain access to the axial proximity probes. The field setting operation is more accurate with this design due to the fact that the axial proximity probes can be accessed quicker, and set when the machine is at a temperature closer to that of the warm up run.

In accordance with a first aspect of the invention, an apparatus is provided for providing access to one or more axial proximity probes for monitoring axial position of one or more thrust collars of a pump shaft to enable improved adjustment of the axial proximity probes by the pump operator. The apparatus comprises a plurality of side walls configured to surround one or more axial proximity probes configured to measure an axial position of one or more thrust collars in a pump bearing housing; at least one access window formed through at least one side wall of the apparatus configured to provide access to the one or more axial proximity probes; and at least one removable access plate configured to at least partly cover the at least one access window.

In accordance with a further embodiment of the apparatus of the first aspect of the invention, the at least one removable access plate comprises an opening formed therethrough configured to receive a wiring housing and the wiring housing is configured to receive wiring connected to an axial proximity probe of the one or more axial proximity probes.

In accordance with any of the aforementioned embodiments of the apparatus of the first aspect of the invention, in a further embodiment, the at least one removable access plate comprises a mounting block and the opening is formed through the mounting block; and the wiring housing is configured to be mounted in the mounting block.

In accordance with any of the aforementioned embodiments of the apparatus of the first aspect of the invention, in a further embodiment, the mounting block of the at least one removable access plate comprises a sloped surface, and the opening through the mounting block and the at least one removable access plate is formed at a non-perpendicular angle relative to the at least one removable access plate.

In accordance with any of the aforementioned embodiments of the apparatus of the first aspect of the invention, in a further embodiment, the apparatus further comprises a first plurality of openings positioned around the at least one access window, a second plurality of openings formed through the at least one access plate configured to align with the first plurality of openings when the at least one access plate covers the at least one access window, and a plurality of bolts configured to be inserted through the first and second plurality of openings to secure the at least one access plate to the at least one access window and configured to be removable to remove the at least one access plate from the at least one access window. The plurality of bolts and at least the first plurality of openings can be threaded.

In accordance with any of the aforementioned embodiments of the apparatus of the first aspect of the invention, in a further embodiment, the apparatus comprises at least two access windows and at least two removable access plates.

In accordance with any of the aforementioned embodiments of the apparatus of the first aspect of the invention, in a further embodiment, a first end of the apparatus is configured to be attached to the pump bearing housing and a second end of the apparatus is configured to be attached to an oil pump adapter configured to be connected to an auxiliary oil pump.

In accordance with any of the aforementioned embodiments of the apparatus of the first aspect of the invention, in a further embodiment, the apparatus further comprises one or more mounting tabs, wherein the one or more axial proximity probes are mounted in the one or more mounting tabs of the apparatus.

In accordance with any of the aforementioned embodiments of the apparatus of the first aspect of the invention, in a further embodiment, the one or more axial proximity probes each comprise an adjustment collar configured to permit adjustment of an axial position of the one or more axial proximity probes.

In accordance with a second aspect of the invention, an apparatus is provided comprising a pump bearing housing comprising a pump shaft and one or more thrust collars around the pump shaft and one or more axial proximity probes configured to measure an axial position of the one or more thrust collars. The apparatus further comprises an adapter comprising a plurality of side walls configured to surround the one or more axial proximity probes; at least one access window formed through at least one side wall of the adapter configured to provide access the one or more axial proximity probes; and at least one removable access plate configured to at least partly cover the at least one access window.

In accordance with a further embodiment of the apparatus of the second aspect of the invention, the apparatus further comprises one or more wires, each configured to connect the one or more axial proximity probes to a pump monitoring system.

In accordance with any of the aforementioned embodiments of the apparatus of the second aspect of the invention, in a further embodiment, the apparatus further comprises one or more wiring housings configured to receive the one or more wires.

In accordance with any of the aforementioned embodiments of the apparatus of the second aspect of the invention, in a further embodiment, the at least one removable access plate of the adapter comprises an opening formed therethrough to receive a wiring housing of the one or more wiring housings.

In accordance with any of the aforementioned embodiments of the apparatus of the second aspect of the invention, in a further embodiment, the at least one removable access plate comprises a mounting block and the opening is formed through the mounting block; and the wiring housing is configured to be mounted in the mounting block.

In accordance with any of the aforementioned embodiments of the apparatus of the second aspect of the invention, in a further embodiment, the mounting block of the at least one removable access plate comprises a sloped surface, and the opening through the mounting block and the at least one removable access plate is formed at a perpendicular angle relative to the sloped surface of the at least one removable access plate so that the wiring housing is mounted in the mounting block perpendicular to the sloped surface of the at least one removable access plate.

In accordance with any of the aforementioned embodiments of the apparatus of the second aspect of the invention, in a further embodiment, the adapter further comprises a first plurality of openings positioned around the at least one access window, a second plurality of openings formed through the at least one access plate configured to align with the first plurality of openings when the at least one access plate covers the at least one access window, and a plurality of bolts configured to be inserted through the first and second plurality of openings to secure the at least one access plate to the at least one access window and configured to be removable to remove the at least one access plate from the at least one access window. The plurality of bolts and at least the first plurality of openings can be threaded.

In accordance with any of the aforementioned embodiments of the apparatus of the second aspect of the invention, in a further embodiment, the adapter comprises at least two access windows and at least two removable access plates.

In accordance with any of the aforementioned embodiments of the apparatus of the second aspect of the invention, in a further embodiment, the apparatus further comprises an auxiliary oil pump attached to the adapter by an oil pump adapter and configured to pump lubricating oil to the pump bearing housing.

In accordance with any of the aforementioned embodiments of the apparatus of the second aspect of the invention, in a further embodiment, the one or more axial proximity probes are mounted to one or more mounting tabs in the adapter.

In accordance with any of the aforementioned embodiments of the apparatus of the second aspect of the invention, in a further embodiment, the one or more axial proximity probes each comprise an adjustment collar configured to permit adjustment of an axial position of the one or more axial proximity probes.

BRIEF DESCRIPTION OF THE DRAWING

The drawings include the following Figures, which are not necessarily drawing to scale.

DETAILED DESCRIPTION OF THE INVENTION

The present invention will now be described with reference made to FIGS. 2A-4C.

In accordance with an embodiment of the present invention, an apparatus 112, namely a filler plate adapter 112 is provided for use with a bearing housing 110 of a pump that is configured to provide improved access to axial proximity probes 111 on a filler plate adapter 112 affixed to the bearing housing 110. The filler plate adapter 112 includes a plurality of side walls 112a configured to surround the axial proximity probes 111. In accordance with one embodiment of the present invention, the axial proximity probes 111 are attached to mounting tabs 112c within the filler plate adapter 112 to form a single apparatus comprising the filler plate adapter 112 and the axial proximity probes 111. In alternative embodiments of the invention, the axial proximity probes 111 may be attached to the bearing housing 110 separately from the filler plate adapter 112.

The filler plate adapter 112 is configured on one end to be attached to the bearing housing 110. For example, in the embodiments shown in FIGS. 2A-2C, the filler plate adapter 112 comprises a series of bolts around the perimeter of the filler plate adapter 112 that are received in corresponding openings through the bearing housing 110 to secure the filler plate adapter 112 to the bearing housing 110.

Figure 2A:
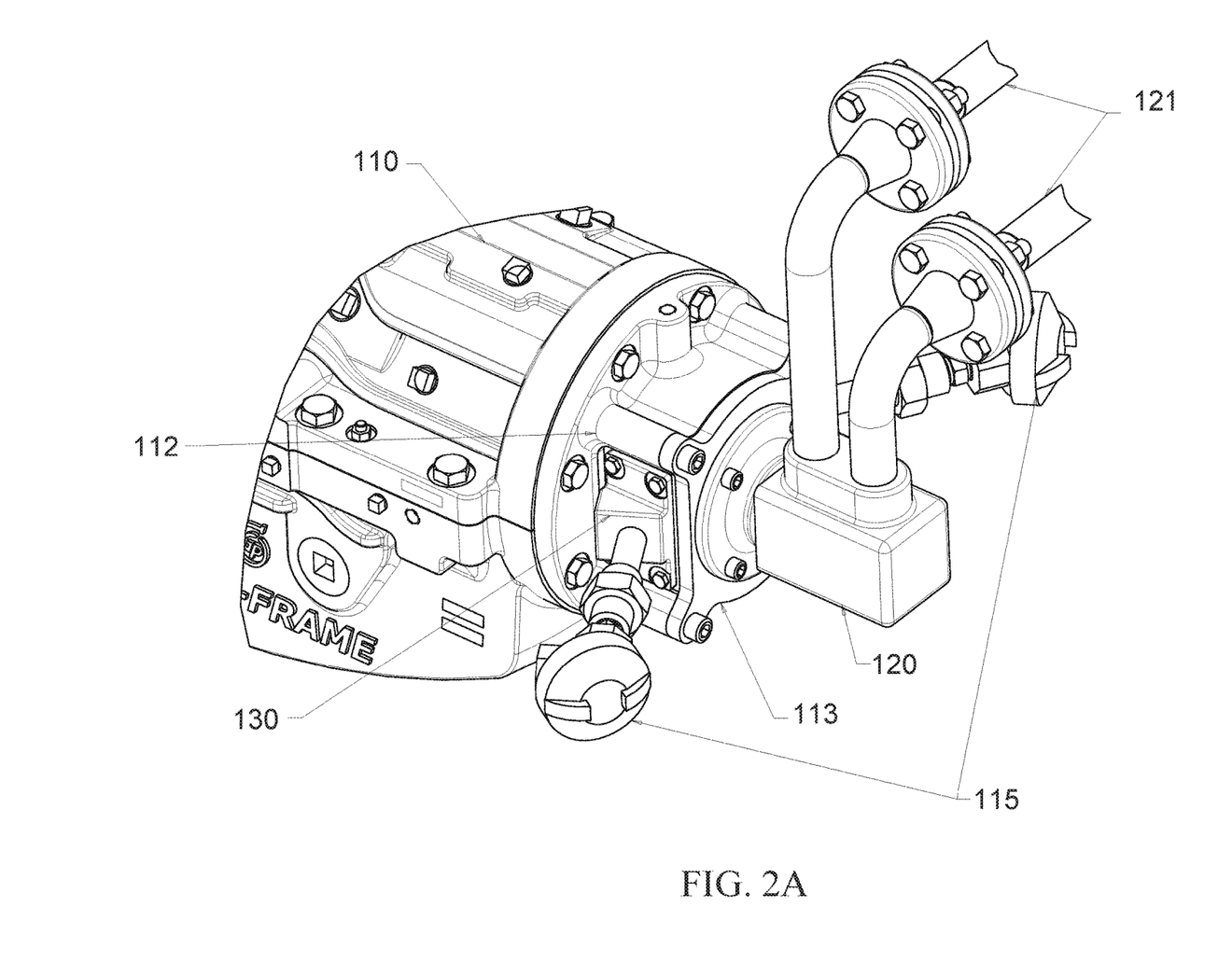
FIG. 2A shows a pump bearing housing comprising an apparatus according to an embodiment of the present invention.
Figure 2B:
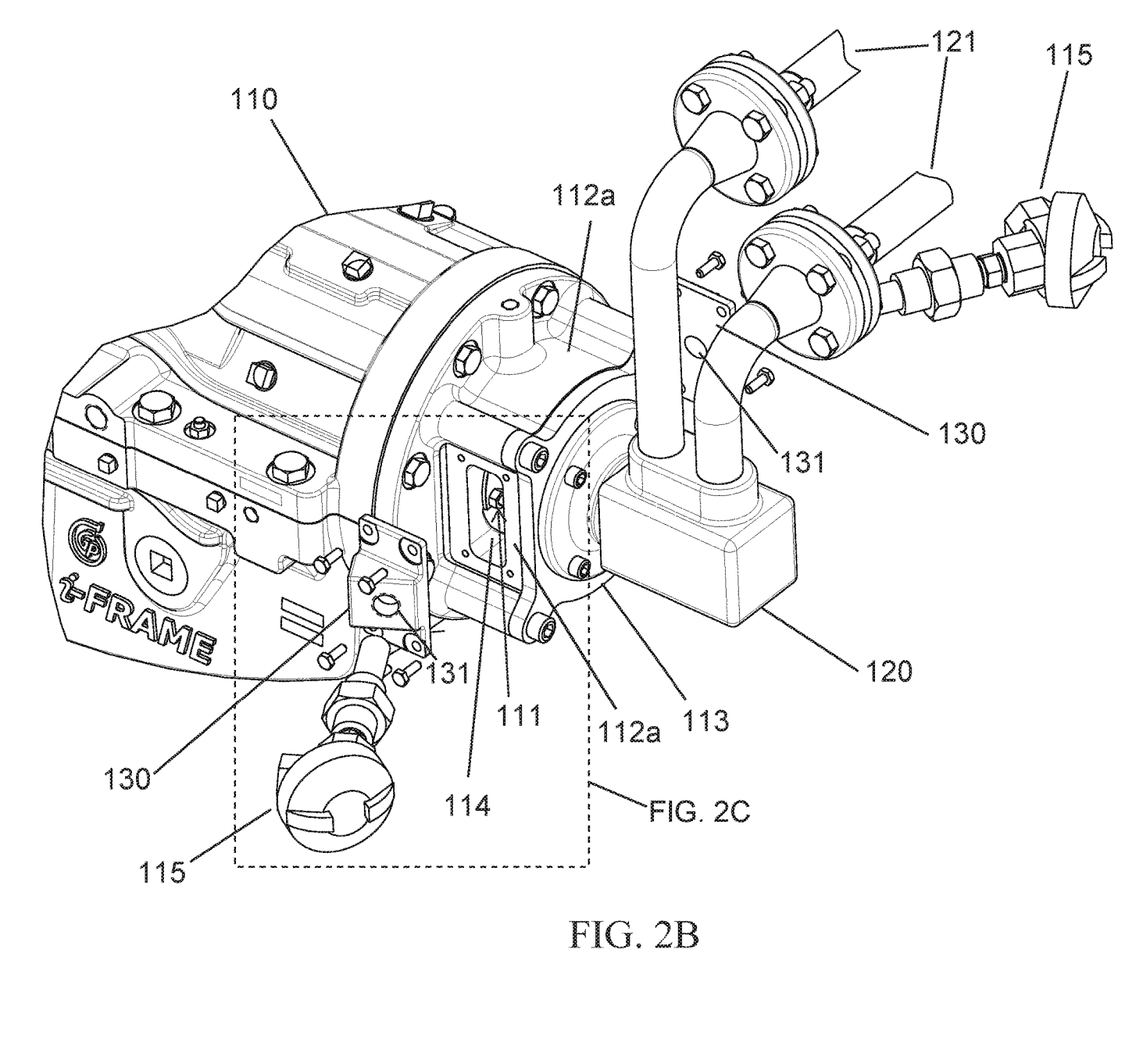
FIG. 2B shows a pump bearing housing comprising an apparatus having the probe access plate of the apparatus removed, according to an embodiment of the present invention.
Figure 2C:
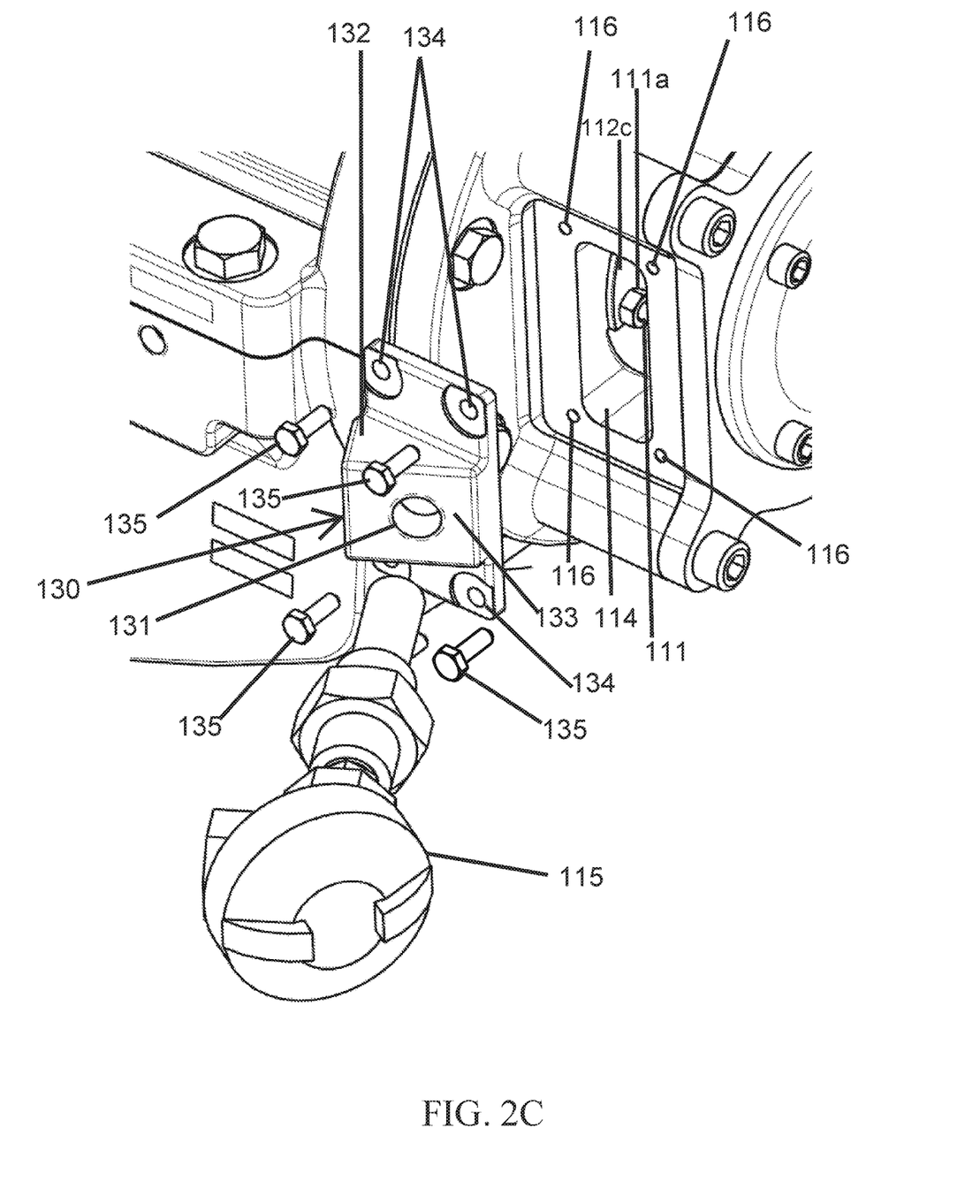
FIG. 2C shows a further view of a pump bearing housing comprising an apparatus having the probe access plate of the apparatus removed, according to an embodiment of the present invention.
Figure 3:
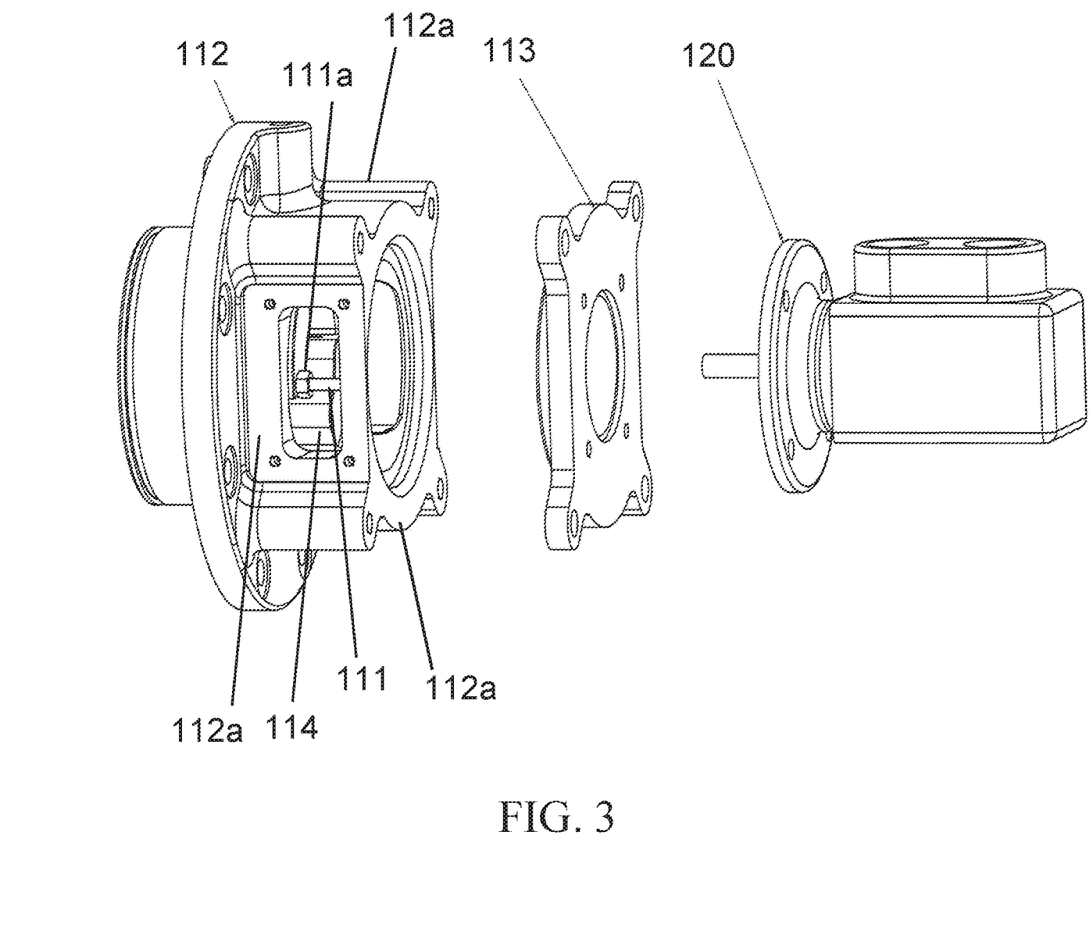
FIG. 3 shows an exploded view of an apparatus according to an embodiment of the present invention.
Figure 4A:
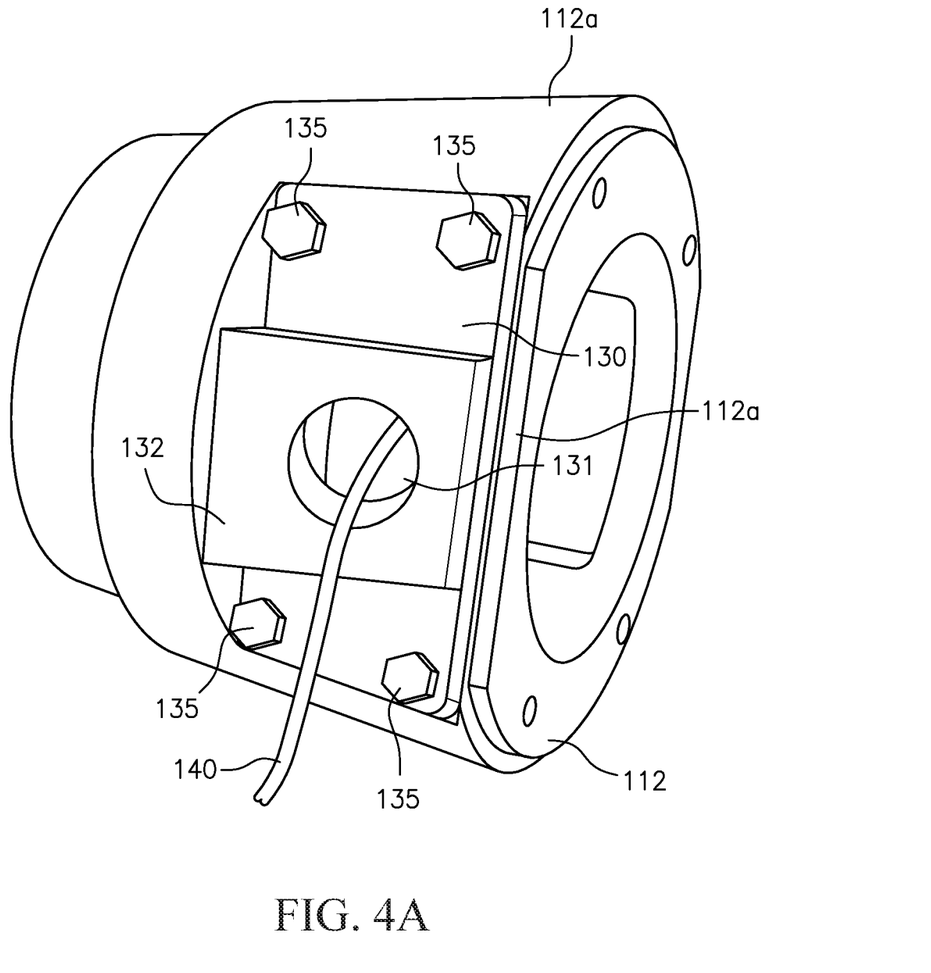
FIG. 4A shows a perspective view of an apparatus with an attached probe access plate, according to an embodiment of the present invention.
Figure 4B:
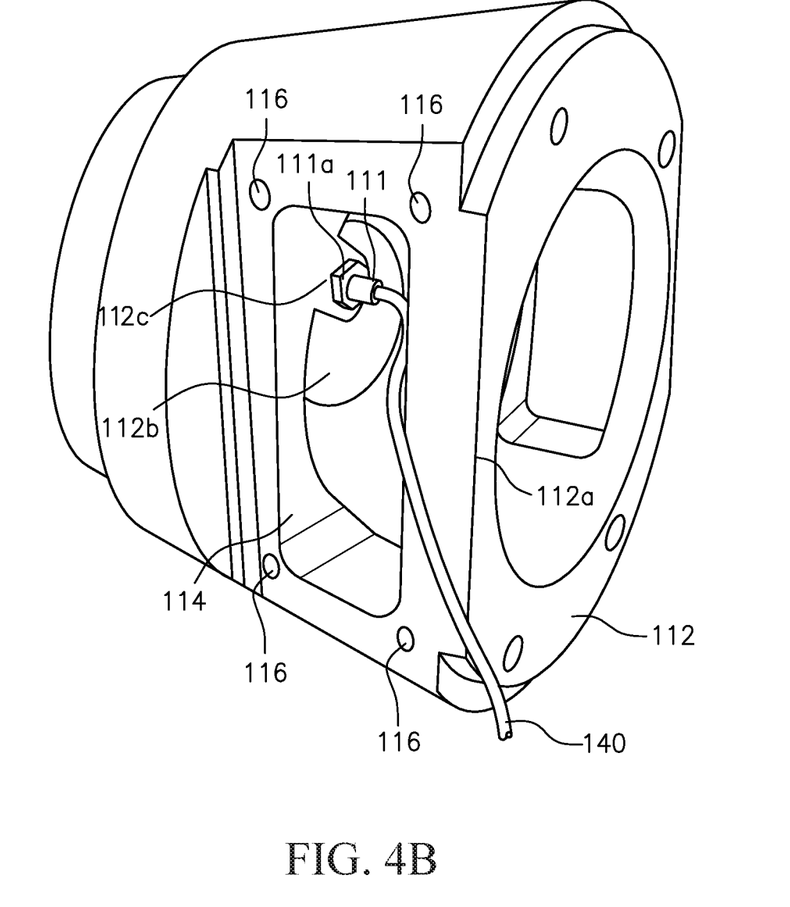
FIG. 4B shows a perspective view of an apparatus with a probe access plate removed, according to an embodiment of the present invention.
Figure 4C:
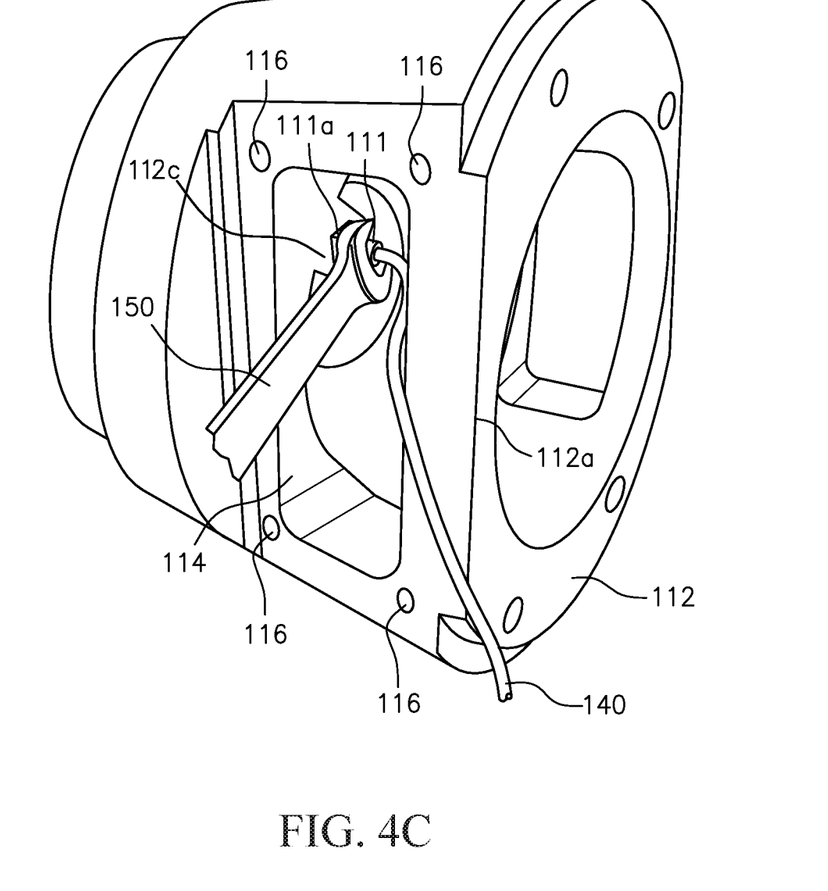
FIG. 4C shows a further perspective view of an apparatus with a probe access plate removed, according to an embodiment of the present invention.

In the embodiments shown in FIGS. 2A-2C, the filler plate adapter 112 may be used in combination with an oil pump adapter 113 that is configured on another end to be attached to an auxiliary oil pump 120 connected to piping 121 supplying a lubricating oil to the bearing housing 110. However, in alternative embodiments of the invention, the filler plate adapter 112 may be configured for use with other devices attached to the end of the bearing housing 110.

The filler plate adapter 112 comprises one or more access windows 114 formed in one or more side walls 112a of the filler plate adapter 112, which are open so as to provide access to the axial proximity probes 111 within the walls 112a of the filler plate adapter 112. The access windows 114 are dimensioned to allow a pump operator to insert a wrench 150 or other tool through the access window 114 and adjust or set the axial proximity probes 111 by turning the locking collars 111a of the axial proximity probes 111, which may be hexagonal nuts or other shaped-nuts. Multiple access windows 114 may be provided on the filler plate adapter 112 to access multiple axial proximity probes 111. For example, in the embodiments shown in FIGS. 2A-2C, two axial proximity probes 111 are included and two access windows 114 are provided on the filler plate adapter 112. In alternative embodiments, only one axial proximity probe 111 may be used for the bearing housing 110, and the filler plate adapter 112 may comprise only one access window 114 or may comprise two or more access windows 114 to provide access to the axial proximity probe 111 from two or more sides 112a of the filler plate adapter 112.

The filler plate adapter 112 may comprise one or more mounting tabs 112c configured to receive and mount the axial proximity probes 111. The mounting tab 112c can be arranged on the interior of a wall 112a of the filler plate adapter 112 and adjacent to the access windows 114. The mounting tab 112c comprises an opening (not shown) through the tab 112c that is configured to receive an axial proximity probe 111. A single mounting tab 112c can be utilized for mounting an axial proximity probe 111, and the number of mounting tabs 112c in the filler plate adapter 112 may vary depending on the number of axial proximity probes 111. The filler plate adapter 112 may also comprise a plate 112b to fills the void between the thrust bearing (not shown) and the interior of the filler plate adapter 112. In certain embodiments of the present invention, the one or more axial proximity probes 111 can be attached to the plate 112b.

One or more axial proximity probe access plates 130 are provided to cover the access windows 114 during operation of the pump, when the operator does not need to adjust or access the axial proximity probes 111. The access plates 130 are dimensioned so as to cover the access window 114. An opening 131 is provided through each access plate 130, which is configured to receive an end portion of a probe wiring housing 115. Wring 140 connected to each axial proximity probe 111 is configured to pass through the opening 131 and through the probe wiring housing 115, and the wiring 140 can pass through an open end (not shown) of the probe wiring housing 115 for connection to a pump monitoring system.

In certain embodiments of the present invention, the opening 131 may pass through a mounting block 132 on the access plate 130. The probe wiring housing 115 is configured to be mounted in the mounting block 132 of the access plate 130. The mounting block 132 may include a sloped surface 133 that is configured to orient the probe wiring housing 115 at an angle away from the bearing housing 110. The opening 131 may be formed through the mounting block 132 at an angle that is non-perpendicular relative to the base of the access plate 130 attached to filler plate adapter 112 but perpendicular to the sloped surface 133. In alternative embodiments of the invention, the access plates 130 may be provided without a mounting block 132 or a sloped surface 133 without departing from the scope of the invention.

The access plate 130 can be attached and detached from the filler plate adapter 112 as needed. The access plate 130 comprises a plurality of openings 134 configured to receive a plurality of bolts or screws 135. A plurality of openings 116 are provided around the access window 114 in corresponding locations, so that when the access plate 130 is positioned over the access window 114, the openings 134 of the access plate 130 overlap with the openings 116 around the access window 114 and the bolts or screws 135 can be inserted through the overlapping openings 134 and 116. In a preferred embodiment, the bolts or screws 135 and one or both of the openings 134 and openings 116 may be threaded so that the access plate 130 can be securely fastened to filler plate adapter 112. In the embodiments shown in the FIGS. 2A-4C, four bolts or screws 135 and four openings 134 and 116 are provided, which are arranged in the corners of the access plate 130. However, in other embodiments, a different number of bolts or screws 135 and openings 134 and 116 can be provided. In alternative embodiments, the access plate 130 can be attached to the filler plate adapter 112 to cover the access window 114 using alternative means, such as magnetically attaching the access plate 130 to the filler plate adapter 112, providing one or more slots around the access window 114 that the access plate 130 can slide into, or providing latches or other locking members around the access window 114 that can latch or lock the access plate 130 over the access window 114.

During operation, after the pump has warmed up, the access plate 130 can be removed from the filler plate adapter 112 by removing the bolts or screws 135, and the operator can access and adjust the locking collar 111a of the axial proximity probe 111. The operator does not need to detach the filler plate adapter 112 from the bearing housing 110 and does not need to detach the auxiliary oil pump 120 or piping 121 in order to set the axial proximity probes 111.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

What is claimed:

1. An apparatus comprising:
    a plurality of side walls, wherein the plurality of side walls is configured on one end to be attached to a pump bearing housing and to surround one or more axial proximity probes configured to measure an axial position of one or more thrust collars in the pump bearing housing;
    at least one access window formed through at least one side wall of the plurality of side walls of the apparatus, wherein the at least one access window is essentially rectangular in shape and configured to provide access to a wrench inserted in order to turn a locking collar of the one or more axial proximity probes arranged within the at least one side wall;
    at least one removable access plate configured to at least partly cover the at least one access window: and
    one or more mounting tabs attached to one of the plurality of side walls, wherein the one or more axial proximity probes are mounted in the one or more mounting tabs of the apparatus.

2. The apparatus of claim 1, wherein the at least one removable access plate comprises an opening formed therethrough configured to receive a wiring housing, wherein the wiring housing is configured to receive wiring connected to an axial proximity probe of the one or more axial proximity probes.

3. The apparatus according to claim 2, wherein the at least one removable access plate comprises a mounting block and the opening is formed through the mounting block; and
    wherein the wiring housing is configured to be mounted in the mounting block.

4. The apparatus according to claim 3, wherein the mounting block of the at least one removable access plate comprises a sloped surface, and wherein the opening through the mounting block and the at least one removable access plate is formed at a perpendicular angle relative to the sloped surface of the at least one removable access plate.

5. The apparatus according to claim 1, further comprising:
    a first plurality of openings positioned around the at least one access window,
    a second plurality of openings formed through the at least one access plate configured to align with the first plurality of openings when the at least one access plate covers the at least one access window, and
    a plurality of bolts configured to be inserted through the first and second plurality of openings to secure the at least one access plate to the at least one access window and configured to be removable to remove the at least one access plate from the at least one access window;
    wherein the plurality of bolts and at least the first plurality of openings are threaded.

6. The apparatus according to claim 1, wherein the apparatus comprises at least two access windows and at least two removable access plates.

7. The apparatus according to claim 1, wherein a second end of the apparatus is configured to be attached to an oil pump adapter configured to be connected to an auxiliary oil pump.

8. The apparatus according to claim 1, wherein the locking collar of the one or more axial proximity probes is configured to permit adjustment of an axial position of the one or more axial proximity probes.

9. An apparatus comprising:
    a pump bearing housing comprising a pump shaft and one or more thrust collars around the pump shaft;
    one or more axial proximity probes configured to measure an axial position of the one or more thrust collars; and
    an adapter comprising:
        a plurality of side walls, wherein the plurality of side walls is configured on one end to be attached to a pump bearing housing and to surround the one or more axial proximity probes;
        at least one access window formed through at least one side wall of the plurality of side walls of the adapter, wherein the at least one access window is essentially rectangular in shape and configured to provide access to a wrench inserted in order to turn a locking collar of the one or more axial proximity probes arranged within the at least one side wall;
        at least one removable access plate configured to at least partly cover the at least one access window; and one or more mounting tabs attached to one of the plurality of side walls, wherein the one or more axial proximity probes are mounted in the one or more mounting tabs of the apparatus.

10. The apparatus according to claim 9, further comprising one or more wires, each configured to connect the one or more axial proximity probes to a pump monitoring system.

11. The apparatus according to claim 10, further comprising one or more wiring housings configured to receive the one or more wires.

12. The apparatus according to claim 11, wherein the at least one removable access plate of the adapter comprises an opening formed therethrough configured to receive a wiring housing of the one or more wiring housings.

13. The apparatus according to claim 11, wherein the at least one removable access plate comprises a mounting block and the opening is formed through the mounting block; and wherein the wiring housing is configured to be mounted in the mounting block.

14. The apparatus according to claim 13, wherein the mounting block of the at least one removable access plate comprises a sloped surface, and wherein the opening through the mounting block and the at least one removable access plate is formed at a perpendicular angle relative to the sloped surface of the at least one removable access plate so that the wiring housing is mounted in the mounting block perpendicular to the sloped surface of the at least one removable access plate.

15. The apparatus according to claim 9, wherein the adapter further comprises:

a first plurality of openings positioned around the at least one access window, a second plurality of openings formed through the at least one access plate configured to align with the first plurality of openings when the at least one access plate covers the at least one access window, and a plurality of bolts configured to be inserted through the first and second plurality of openings to secure the at least one access plate to the at least one access window and configured to be removable to remove the at least one access plate from the at least one access window;

wherein the plurality of bolts and at least the first plurality of openings are threaded.

16. The apparatus according to claim 9, wherein the adapter comprises at least two access windows and at least two removable access plates.

17. The apparatus according to claim 9, further comprising:

an auxiliary oil pump attached to the adapter by way of an oil pump adapter and configured to pump a lubricating oil to the pump bearing housing.

18. The apparatus according to claim 9, wherein the locking collar of the one or more axial proximity probes is configured to permit adjustment of an axial position of the one or more axial proximity probes.

\* \* \* \* \*